US012625220B2

(12) United States Patent
Villien

(10) Patent No.: US 12,625,220 B2
(45) Date of Patent: May 12, 2026

(54) METHOD FOR DETERMINING A CORRECTED DISTANCE

(71) Applicant: Commissariat à l'Energie Atomique et aux Energies Alternatives, Paris (FR)

(72) Inventor: Christophe Villien, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 596 days.

(21) Appl. No.: 18/056,903

(22) Filed: Nov. 18, 2022

(65) Prior Publication Data

US 2023/0152414 A1 May 18, 2023

(30) Foreign Application Priority Data

Nov. 18, 2021 (FR) ...................................... 21 12172

(51) Int. Cl.
*G07C 5/00* (2006.01)
*G01P 15/02* (2013.01)
(Continued)

(52) U.S. Cl.
CPC .............. *G01S 5/021* (2013.01); *G01P 15/02* (2013.01); *G01P 15/18* (2013.01)

(58) Field of Classification Search
CPC ...... G01S 5/021; G01S 5/0269; G01S 5/0294; G01S 7/40; G01S 13/765; G01P 15/02; G01P 15/18
See application file for complete search history.

(56) References Cited

U.S. PATENT DOCUMENTS 5,796,613 A * 8/1998 Kato ...................... G01C 21/28
701/472
6,084,547 A * 7/2000 Sanderford ........... G01S 5/0252
342/463

(Continued)

FOREIGN PATENT DOCUMENTS

CN 112349143 A * 2/2021 ............. B60R 11/02
CN 112839855 A * 5/2021 ........ B60W 50/0097

(Continued)

OTHER PUBLICATIONS

French Preliminary Search Report and Written Opinion Issued Jun. 27, 2022 in French Application 21 12172 filed on Nov. 18, 2021 (with English Translation of Categories of Cited Documents), 11 pages.

(Continued)

*Primary Examiner* — Kito R Robinson
*Assistant Examiner* — Anthony Gabriel Mora
(74) *Attorney, Agent, or Firm* — Oblon, McClelland, Maier & Neustadt, L.L.P.

(57) ABSTRACT

A method determines a corrected distance between a mobile transceiver fastened to a vehicle and a fixed transceiver. The method includes: identification, among a set of predetermined path segments, of the segment on which the vehicle is currently found on the basis of the last position determined for this vehicle, then selection of a correction function specifically associated with the identified segment using a table that associates, with each path segment, a respective correction function, then execution of the identified correction function to obtain a current correction coefficient for correcting a raw distance computed from transmission and reception times of the radio signals exchanged between the fixed and mobile transceivers, then correction of the last raw (Continued)

distance computed using the current correction coefficient to obtain the corrected distance.

10 Claims, 2 Drawing Sheets

(51) Int. Cl.
  *G01P 15/18* (2013.01)
  *G01S 5/02* (2010.01)
  *G07C 5/02* (2006.01)
  *G07C 5/04* (2006.01)
  *G07C 5/08* (2006.01)

(56) References Cited

U.S. PATENT DOCUMENTS

| | | | | |
|---|---|---|---|---|
| 10,080,144 | B1 * | 9/2018 | Wills | G06G 7/78 |
| 10,562,291 | B2 * | 2/2020 | Lucas | G01D 5/34707 |
| 2003/0067396 | A1 * | 4/2003 | Hassett | G07C 5/008 |
| | | | | 340/8.1 |
| 2003/0216865 | A1 | 11/2003 | Riewe et al. | |
| 2013/0194415 | A1 * | 8/2013 | Abe | G01C 11/02 |
| | | | | 348/92 |
| 2017/0234979 | A1 * | 8/2017 | Mathews | G01S 1/024 |
| | | | | 342/357.64 |
| 2019/0250241 | A1 * | 8/2019 | Alawieh | G01S 5/02213 |
| 2020/0326189 | A1 * | 10/2020 | Villien | G01S 19/47 |
| 2022/0268930 | A1 * | 8/2022 | Jo | G01S 7/483 |
| 2023/0115240 | A1 * | 4/2023 | Sidhu | B60W 60/0053 |
| | | | | 701/25 |

FOREIGN PATENT DOCUMENTS

| | | | | |
|---|---|---|---|---|
| JP | 2008109217 | A | * | 5/2008 |
| WO | WO 2021/143920 | A1 | | 7/2021 |

OTHER PUBLICATIONS

Di Pietra, V. et al., "Loosely Coupled GNSS and UWB with INS Integration for Indoor/Outdoor Pedestrian Navigation", Sensors, vol. 20, No. 21, 2020, 22 pages.

Zhao, W. et al., "Learning-Based Bias Correction for Time Difference of Arrival Ultra-Wideband Localization of Resource-Constrained Mobile Robots", ARXIV.org, Cornell University Library, 2021, 8 pages.

Godha, S., "Performance Evaluation of Low Cost MEMS-Based IMU Integrated With GPS for Land Vehicle Navigation Application", UCGE Reports No. 20239, 2006, 230 pages.

Navarro, M. et al., "Hybrid GNSS/INS/UWB Positioning for Live Demonstration Assisted Driving", IEEE Intelligent Transportation Systems Conference (ITSC), 2019, 8 pages.

Zhu, B. et al., "An Integrated GNSS/UWB/DR/VMM Positioning Strategy for Intelligent Vehicles", IEEE, 2020, 11 pages.

Decawave, "Sources of Error in DW1000 Based Two-Way Ranging (TWR) Schemes", APS011 Application Note, Version 1.1, 2014, 22 pages.

* cited by examiner

METHOD FOR DETERMINING A CORRECTED DISTANCE

The invention relates to a method for determining a corrected distance between a mobile transceiver fastened to a vehicle and a fixed transceiver.

The invention also relates to:

a method for locating a vehicle implementing the method for determining a corrected distance, and a system for determining a corrected distance.

Such distance-determining methods are for example implemented in methods for locating a vehicle. Such a locating method is for example described in the following article: V. Di Pietra et al.: "*Loosely Coupled GNSS and UWB with INS Integration for Indoor/Outdoor Pedestrian Navigation*", Sensors, May 11, 2020.

More precisely, in such locating methods, the distance between the fixed and mobile transceivers is used to correct a position of the vehicle estimated using other sensors. Thus, the more accurate the distance, the more accurate the position of the vehicle.

The distance between the fixed and mobile transceivers is obtained from the transmission and reception times of radio signals exchanged between these transceivers. These radio signals are electromagnetic waves that propagate at the speed of light. Thus, even a very small error in the measurement of these transmission and reception times results in an error of several tens of centimetres in the determined distance.

To overcome this problem, it has been proposed to correct a raw distance, computed solely from the measured transmission and reception times, by adding a correction coefficient thereto. The difficulty is then that the value of this correction coefficient depends on a plurality of parameters, notably including:

the relative orientation of the antenna of the mobile transceiver with respect to the antenna of the fixed transceiver, the presence on the path of the exchanged radio signals of any elements, notably metal elements, able to perturb propagation of the signal, and the power of the radio signals received by the fixed and mobile transceivers.

A variation in the power of the radio signals received by the fixed and mobile transceivers generally induces a variation in time lags in the mechanism for detecting arrival time within the receiver.

It is therefore difficult to construct a correction function that returns the value of such a correction coefficient given the current position and orientation of the vehicle with respect to the fixed transceiver. As a result, there are mainly two possible strategies. The first strategy consists in using a correction function that is complex and accurate but that is difficult to implement and time-consuming to execute. In particular, such a correction function is difficult to implement because it has very many parameters and because it is difficult to accurately adjust each of these parameters. The second strategy consists, conversely, in using a correction function that is simple to implement and rapid to execute. However, simplification of the implementation of the correction function comes at the price of a lower accuracy.

Prior art relative to these issues may be found in the following documents:

Whenda ZHAO et al.: "Learning-based Bias Correction for Time Difference of Arrival Ultra-wideband Localization of Resource constrained Mobile Robots", Cornell University Library, Feb. 3, 2021, WO2021143920A1, and

US2003216865A1.

The invention aims to overcome this contradiction by providing a method for determining the distance between fixed and mobile transceivers, in which the correction function may be implemented both simply and rapidly without however requiring the accuracy of the determined distance to be decreased.

One subject thereof is therefore such a method for determining a distance.

Another subject of the invention is a method for locating a vehicle implementing the above method for determining a distance.

Lastly, another subject of the invention is a system for determining a distance.

The invention will be better understood on reading the following description, which is given solely by way of non-limiting example, with reference to the drawings, in which.

In these figures, the same references have been used to designate elements that are the same.

In the remainder of this description, features and functions well known to those skilled in the art are not described in detail. In particular, with respect to the general knowledge of those skilled in the art of devices for locating a vehicle using an inertial navigation system, the reader is referred, for example, to the following thesis: S. Godha, "*Performance Evaluation of Low Cost MEMS-Based IMU Integrated With GPS for Land Vehicle Navigation Application*", PhD report, 2006. Below, this thesis is designated by the expression "Godha2006".

In this description, a detailed example of embodiment is first described in Section I with reference to the figures. Next, in the following section, Section II, variants of this embodiment are presented. Lastly, the advantages of the various embodiments are presented in Section III.

Section I: Example of Embodiment

Figure 1:
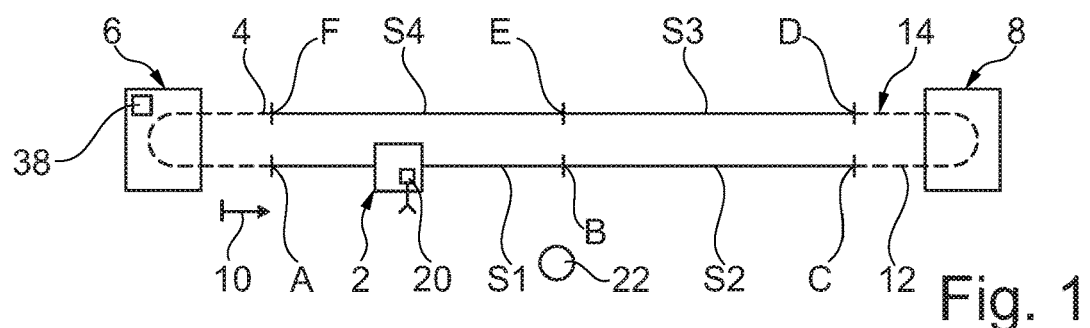
FIG. 1 is a schematic illustration of a vehicle constrained to move along a path.

FIG. 1 shows a vehicle 2 capable of moving along each of the path segments of a predetermined set of a plurality of path segments. Each segment starts at a point, called the "start point" below, and ends at a point, called the "end point" below. The length of path that connects the start and end points of the segment is known in advance and set. The vehicle 2 is constrained, by mechanical or electronic means, to move solely along segments of this group.

For example, in this example of embodiment, the vehicle 2 is a gondola lift suspended from a cable 4. In FIG. 1, lengths of the cable have been drawn with dashed lines to indicate that only one portion of the cable 4 has been shown. The cable 4 forms a loop that extends between a start station 6 and an end station 8. The cable 4 is driven to rotate by a motor in the direction indicated by the arrow 10. The rotation of the cable 4 causes the vehicle 2 to move between the stations 6 and 8 along a loop-shaped path defined by the cable 4. In this context, the path of the vehicle 2 is considered to coincide with the path of the cable 4.

The path of the vehicle 2 here comprises an upward stretch 12 from the station 6 to the station 8, and a downward stretch 14 from the station 8 to the station 6. Here, these upward and downward stretches 12, 14 do not coincide.

With a view to accurately locating the vehicle 2 along its path, the vehicle 2 comprises a radio transceiver 20 located on-board this vehicle. One or more fixed transceivers are also provided, these being located along the path of the vehicle 2. For example, the fixed transceivers are placed at regular intervals along the upward stretch 12. In FIG. 1, a single fixed transceiver 22 has been shown.

The description given below in the particular case of this transceiver 22 applies identically to all the other fixed transceivers placed along the path of the vehicle 2.

The transceiver 22 is immobile and its position in a terrestrial frame of reference $R_T$ is known in advance and does not change. Here, the terrestrial frame of reference $R_T$ is fixed without any degree of freedom to the Earth. The frame of reference $R_T$ comprises three axes, which are typically orthogonal to one another. For example, here, the frame of reference $R_T$ is the ECEF frame of reference (ECEF standing for "Earth Centred, Earth fixed").

In FIG. 1, only four path segments S1, S2, S3 and S4 have been shown. The segments S1 and S2 belong to the upward stretch 12 of the path whereas the segments S3 and S4 belong to the downward stretch 14 of the path. Segment S1 extends from a start point A to an end point B. Segment S2 extends from the point B to an end point C.

Segment S3 extends from a start point D to an end point E. Segment S4 extends from the point E to an end point F. In this embodiment, the end and start point of segments S1 and S2 are coincident. Likewise, the end and start point of segments S3 and S4 are coincident.

Here, the points B and E are the points, of the upward and downward stretches 12, 14 respectively, closest to the transceiver 22.

Whatever the position of the vehicle on any one of the segments S1 to S4, the fixed and mobile transceivers are capable of exchanging data frames allowing the distance that separates them to be measured. As a result, below, segments S1 to S4 are said to be "associated" with the fixed transceiver 22.

Typically, the movement of the vehicle 2 is controlled from a control post 38. Here, this post 38 is located in the start station 6.

Figure 2:
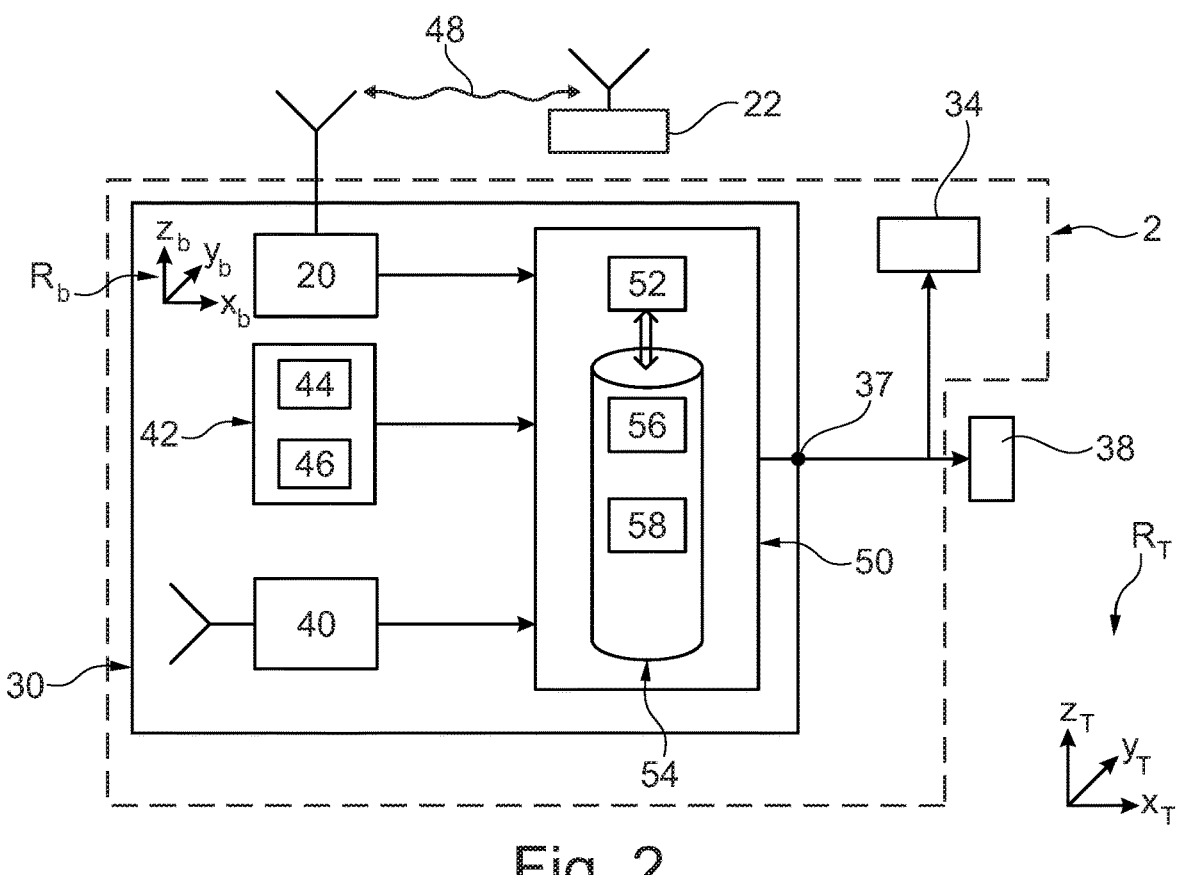
FIG. 2 is a schematic illustration of a system for locating the vehicle of FIG. 1.

FIG. 2 shows in more detail the vehicle 2 and notably a system 30 for locating the vehicle 2 located on-board this vehicle.

The system 30 is able to determine the position, orientation and speed of the vehicle 2 in the terrestrial frame of reference $R_T$. To this end, a mobile frame of reference $R_b$ that is fixed with no degree of freedom to the body of the vehicle 2 is defined. This frame of reference $R_b$ comprises three axes that are orthogonal to one another, denoted $x_b$, $y_b$ and $z_b$, respectively. Conventionally, when the vehicle 2 moves horizontally, the axes $x_b$ and $y_b$ are in a horizontal plane and the axis $z_b$ is vertical. Here the axis $x_b$ is oriented and points in the direction in which the vehicle moves when it moves forward.

Here, the position of the vehicle 2 in the frame of reference $R_T$ is expressed by coordinates of the origin of the frame of reference $R_b$ in the frame of reference $R_T$.

The orientation of the vehicle 2 is expressed by the yaw angle $\psi$, the pitch angle $\theta$ and the roll angle $\phi$ of the frame of reference $R_b$ with respect to a frame of reference referred to as the "navigation" frame of reference. In practice, most often, the orientation of the vehicle takes the form of an orientation matrix from which it is possible to deduce the yaw angle, the pitch angle and the roll angle of the vehicle. The orientation of the vehicle may also take the form of a vector directly comprising the yaw angle, the pitch angle and the roll angle of the vehicle. Below, these two particular cases will be considered to be equivalent and hence the orientation of the vehicle will be considered to comprise the yaw angle, the pitch angle and the roll angle of the vehicle if these three angles can be deduced directly from a matrix or a vector.

The position, orientation and speed determined by the system 30 are delivered to an output 37. Below, the position, orientation and speed delivered to the output 37 by the system 30 for a time $t_k$ are denoted P(k), O(k) and V(k), respectively.

The output 37 is for example connected to a human-machine interface 34 that is housed in the vehicle 2 and that displays the position, orientation and speed determined by the system 30. The output 37 may also be connected to the control post 38 via a wireless or wired link. In the latter case, the position, orientation and speed determined by the system 30 are automatically converted into commands for controlling the motor used to drive the cable 4.

The system 30 comprises a satellite geolocation unit 40, an inertial measurement unit 42 and the transceiver 20.

The unit 40 is a GNSS unit (GNSS being the acronym of Global Navigation Satellite System). From the satellite signals that it receives, the unit 40 generates signals representative of the position and speed of the vehicle in the frame of reference $R_T$. The unit 40 updates its measurements at a frequency $F_{40}$. Conventionally, the frequency $F_{40}$ is comprised between 0.1 Hz and 20 Hz.

The unit 42 is an IMU (acronym of Inertial Measurement Unit). The unit 42 notably comprises a triaxial accelerometer 44 and a triaxial gyrometer 46. By virtue of these sensors, the unit 42 is capable of measuring the variation in the orientation, position and speed of the vehicle 2. Here, the measurement axes of the accelerometer 44 and of the gyrometer 46 are coincident with the axes $x_b$, $y_b$ and $z_b$ of the frame of reference $R_b$, respectively. In addition, the accelerometer 44 is arranged so that a positive measurement of the acceleration of the vehicle 2 along the axis $x_b$ means that the vehicle 2 accelerates by moving forward.

The unit 42 updates the measurements of acceleration and speed at a high frequency $F_{42}$. Conventionally, the frequency $F_{42}$ is comprised between 20 Hz and 2000 Hz. For example, here, the frequency $F_{42}$ is equal to 200 Hz.

The transceiver 20 exchanges data frames with the transceiver 22 via a wireless radio link 48. These data frames are notably exchanged with a view to measuring, based on the times of flight of these data frames, the distance that separates these transceivers 20, 22. To this end, here, the transceivers 20, 22 are ultra-wideband (UWB) transceivers. The term "ultra-wideband transceiver" or "UWB transceiver" here designates a transceiver that uses a wide frequency band to send and receive the data frames. A "wide" frequency band is a frequency band the width of which is larger than $0.2f_c$, where $f_c$ is the central frequency of this frequency band. Typically, a wide frequency band has a width larger than 250 MHz or even larger than 400 MHz.

Measurement of a distance between the transceivers 20, 22 requires the exchange of a plurality of data frames between these transceivers 20, 22 and measurement of the times of transmission and reception of these data frames. This exchange of data frames is repeated at a frequency $F_{20}$, in order to update at this frequency the distance measurement. The frequency $F_{20}$ is lower than the frequency $F_{42}$.

Typically, the frequency $F_{20}$ is ten or fifty times lower than the frequency $F_{42}$. Conventionally, the frequency $F_{20}$ is comprised between 0.1 Hz and 20 Hz. Here, the times of transmission and reception of the data frames are obtained by the transceiver 20 housed in the vehicle 2.

To determine the position, orientation and speed of the vehicle 2 from the measurements of the units 40 and 42 and from the transmission and reception times obtained by the transceiver 20, the system 30 comprises a programmable electronic computer 50. This computer 50 is able to acquire the measurements of the units 40 and 42 and the transmission and reception times obtained by the transceiver 20. Next, from these measurements, the computer 50 determines the position, orientation and speed of the vehicle 2 in the frame of reference $R_T$. The computer 50 comprises a microprocessor 52 and a memory 54 comprising the instructions and data required to implement the method described with reference to FIG. 4.

More precisely, the memory 54 comprises the instructions of a software module 56 able to determine the position, orientation and speed of the vehicle 2 from the acquired measurements when it is executed by the microprocessor 52. Here, the module 56 notably implements a fusing algorithm that establishes, from a preceding estimation of the position, orientation and speed of the vehicle 2 and from new measurements acquired since this preceding estimation, a new estimation of the position, orientation and speed of the vehicle 2. Typically, the fusing algorithm also establishes margins of error in each new estimation.

The general principles of fusing algorithms are well known to those skilled in the art. For example, the interested reader may once again refer to the thesis Godha2006 cited above. Typically, this fusing algorithm implements one or more Kalman filters. Here, the module 56 employs an architecture known as a "closed loop integration scheme" or "closed loop approach".

Here, the memory 54 also comprises a table 58 that with each segment Sn associates one respective correction function $f_{sn}(d)$, where the index Sn is the identifier of one segment among the segments S1 to S4.

Figure 3:
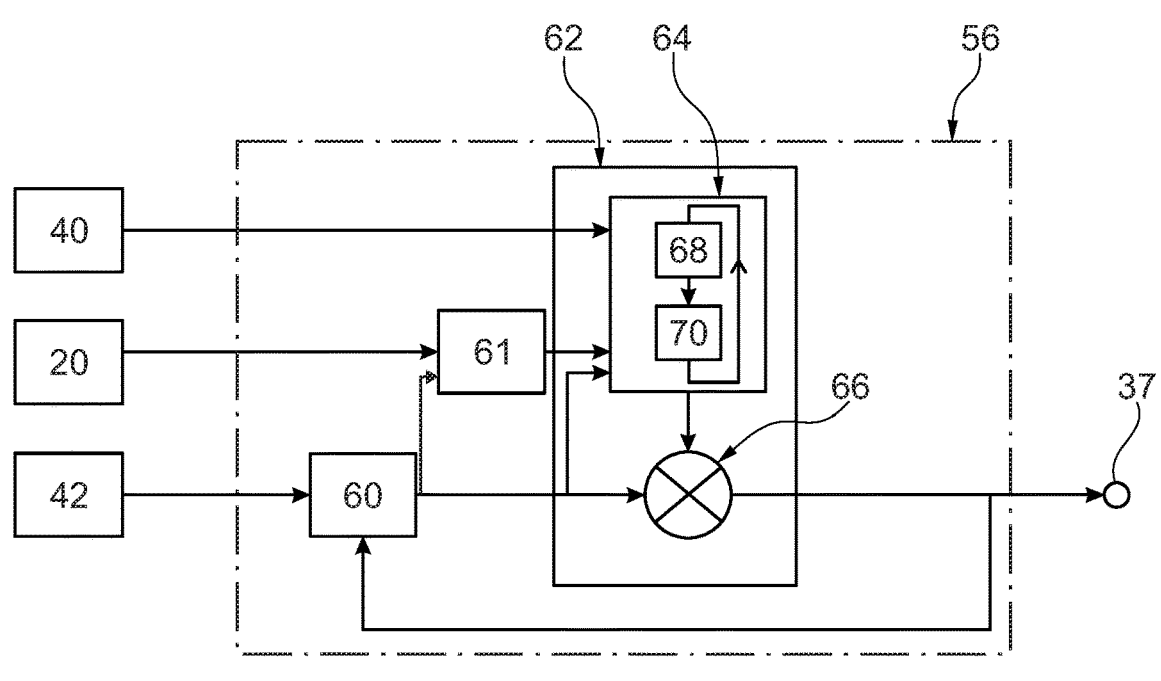
FIG. 3 is a schematic illustration of various software modules implemented in the system of FIG. 2.

FIG. 3 shows in more detail the architecture of the module 56. The module 56 comprises:
- a sub-module 60 for inertial measurement integration,
- a sub-module 61 for computing a corrected distance between the transceivers 20, 22 from the transmission and reception times obtained by the transceiver 20, and
- a correcting sub-module 62.

The general operating principles of the sub-modules 60 and 62 are known. For example, for a detailed description of these general principles, the reader may consult chapter 4 of the thesis Godha2006. Thus, below, only details specific to the invention are described in detail.

The sub-module 60 is also known as the "mechanization". For each time $t_k$, the sub-module 60 constructs a raw estimation of a position $P_e(k)$, orientation $O_e(k)$ and speed $V_e(k)$ of the vehicle 2. In this text, the symbol "k" is the order number of the time $t_k$ in the time-ordered sequence $\{0, t_1, t_2, \ldots, t_{k-1}, t_k, \ldots \}$ of times $t_k$. The order number of the time $t_{k-1}$ that immediately precedes the time $t_k$ is denoted k−1. The position $P_e(k)$, orientation $O_e(k)$ and speed $V_e(k)$ of the vehicle 2 are each a vector containing three coordinates. The coordinates of the position $P_e(k)$ in the frame of reference $R_T$ are denoted $x_e(k)$, $y_e(k)$ and $z_e(k)$. The coordinates of the orientation $O_e(k)$ are denoted $\psi_e(k)$, $\theta_e(k)$ and $\varphi_e(k)$ and the coordinates of the speed $V_e(k)$ are denoted $Vx_e(k)$, $Vy_e(k)$ and $Vz_e(k)$.

The frequency of the times $t_k$ is lower than or equal to the frequency $F_{42}$. Here, the frequency of the times $t_k$ is equal to the frequency $F_{42}$.

The sub-module 60 constructs the position $P_e(k)$, orientation $O_e(k)$ and speed $V_e(k)$ from:
- the preceding position $P(k-1)$, the preceding orientation $O(k-1)$ and the preceding speed $V(k-1)$, i.e. the position, orientation and speed determined for the vehicle 2 at the time $t_{k-1}$ by the system 30 and delivered to the output 37, and
- measurements of the accelerometer 44 and of the gyrometer 46 acquired by the sub-module 60 at the time $t_k$.

The combination of the sub-module 60 and of the unit 42 forms what is known as an INS (acronym of Inertial Navigation System).

The sub-module 61 acquires the transmission and reception times obtained by the transceiver 20 and the last position of the vehicle 2 estimated by the sub-module 60. Next, the sub-module 61 delivers, to the sub-module 62, a corrected distance computed from the acquired transmission and reception times and from the last acquired position of the vehicle 2. The operation of this sub-module 61 is described in more detail with reference to FIG. 4.

At certain particular times $t_k$, the sub-module 62 corrects the position $P_e(k)$, orientation $O_e(k)$ and speed $V_e(k)$ constructed by the sub-module 60 for this time $t_k$, in order to obtain a corrected position $P_c(k)$, a corrected orientation $O_c(k)$ and a corrected speed $V_c(k)$ for this time $t_k$. Below, these particular times $t_k$ are called "times $t_m$". The symbol "m" is equal to the order number of a particular time $t_k$ in the sequence $\{0, t_1, t_2, \ldots, t_k, \ldots \}$. Each order number m is therefore equal to one respective order number k. Thus, the position $P_e(m)$, orientation $O_e(m)$ and speed $V_e(m)$ are equal to the position $P_e(k)$, orientation $O_e(k)$ and speed $V_e(k)$ constructed for the time $t_k$ equal to the time $t_m$, respectively. The sequence $\{0, t_1, t_2, \ldots, t_{m-1}, t_m, \ldots \}$ of times $t_m$ is a sub-set of the sequence $\{0, t_1, t_2, \ldots, t_k, \ldots \}$. Thus, the sub-module 62 does not make the correction for each time $t_k$, but only for some thereof. At each time $t_m$, the sub-module 62 combines the position $P_e(m)$, orientation $O_e(m)$ and speed $V_e(m)$ with respective correction coefficients to obtain the corrected position $P_c(m)$, the corrected orientation $O_c(m)$ and the corrected speed $V_c(m)$. At the times $t_m$, it is the corrected position $P_c(m)$, the corrected orientation $O_c(m)$ and the corrected speed $V_c(m)$ that are delivered to the output 37, and not the position $P_e(m)$, orientation $O_e(m)$ and speed $V_e(m)$. The correction coefficients are updated depending on the measurements of the unit 40 and on the corrected distance determined by the sub-module 61. The correction coefficients are therefore updated at a frequency lower than the frequency $F_{42}$.

The sub-module 62 acquires the measurements of the unit 40 at a frequency lower than or equal to the frequency $F_{42}$. Here, the frequency of acquisition of the measurements of unit 40 is equal to the frequency Foo. Below, the acquisition times of a new measurement of the unit 40 are denoted $tg_i$. These times $tg_i$ form a time-ordered sequence $\{0, tg_1, tg_2, \ldots, tg_i, \ldots \}$ of times $tg_i$. The symbol "i" designates the order number of the time $tg_i$ in this sequence. The sub-module 62 updates the correction coefficients each time a new measurement of the unit 40 is acquired and therefore for each time $tg_i$. The times $tg_i$ are less frequent than the times $t_k$.

The sub-module 62 also acquires the corrected distance, delivered by the sub-module 61, at a frequency lower than or equal to the frequency $F_{42}$. Here, the frequency of acquisition of the corrected distance is equal to the frequency $F_{20}$. Below, the acquisition times of each new corrected distance are denoted to$_j$. The corrected distance acquired at the time to$_j$ is further denoted dc$_j$. The symbol "j" is the order number of the time to$_j$ in the time-ordered sequence $\{0, to_1, to_2, \ldots, to_{j-1}, to_j, \ldots\}$ of times to$_j$. The sub-module 62 also updates the correction coefficients each time a new corrected distance dc$_j$ is acquired and therefore for each time to$_j$. Since the frequency $F_{20}$ is lower than the frequency $F_{42}$, there are systematically a plurality of times $t_k$ between the times to$_{j-1}$ and to$_j$.

Below, the sequences $\{0, tg_1, tg_2, \ldots, tg_{i-1}, tg_i, \ldots\}$ and $\{0, to_1, to_2, \ldots, to_{j-1}, to_1, \ldots\}$ are both considered sub-sets of the sequence $\{0, t_1, t_2, \ldots, t_{k-1}, t_k, \ldots\}$. Thus, each time $tg_i$ and to$_j$ corresponds to one respective time $t_k$ of the sequence $\{0, t_1, t_2, \ldots, t_{k-1}, t_k, \ldots\}$. In addition, in this embodiment, the times $tg_i$ and to$_j$ are different. In other words, at a time $tg_i$ when the measurement of the unit 40 is acquired, no new corrected distance is acquired and vice-versa. Lastly, in this text, the times $t_m$ are equal to the times at which the sub-module 62 acquires either a measurement of the unit 40 or a new corrected distance.

To update the correction coefficients depending on the measurements of the unit 40 and on the corrected distance, the sub-module 62 comprises a Kalman filter 64. To combine the correction coefficients with the raw estimations delivered by the sub-module 60, the sub-module 62 also comprises an adder 66.

Here, the filter 64 is an error-state Kalman filter (ESKF) because it estimates corrections to be made to the position, orientation and speed estimated by the sub-module 60. More precisely, the filter 64 delivers, for each time $t_m$, a state vector $X_{m|m}$. The state vector $X_{m|m}$ notably contains the correction coefficients to be used to correct the position $P_e(m)$, orientation $O_e(m)$ and speed $V_e(m)$. For each time $t_m$, the adder 66 combines the correction coefficients delivered by the filter 64 with the position $P_e(m)$, orientation $O_e(m)$ and speed $V_e(m)$ to obtain the corrected position $P_c(m)$, the corrected orientation $O_c(m)$ and the corrected speed $V_c(m)$. For each time $t_k$ subsequent to the time $t_m$ and prior to the time $t_{m+1}$, no correction is made to the estimations constructed by the sub-module 60.

For example, here, the state vector $X_{m|m}$ contains correction coefficients $\delta_x(m)$, $\delta_y(m)$ and $\delta_z(m)$ for the coordinates $x_e(m)$, $y_e(m)$ and $z_e(m)$ of the position $P_e(m)$, respectively. The adder 66 adds these coefficients $\delta_x(m)$, $\delta_y(m)$ and $\delta_z(m)$ to the coordinates $x_e(m)$, $y_e(m)$ and $z_e(m)$ to obtain the coordinates $x_c(m)$, $y_c(m)$ and $z_c(m)$ of the corrected position $P_c(m)$, respectively.

The state vector $X_{m|m}$ also contains correction coefficients $\delta_\psi(m)$, $\delta_\theta(m)$ and $\delta_\varphi(m)$ for the coordinates $\psi_e(m)$, $\theta_e(m)$ and $\varphi_e(m)$ of the orientation $O_e(m)$, respectively. The adder 66 adds these coefficients $\psi_e(m)$, $\theta_e(m)$ and $\varphi_e(m)$ to the coordinates $\psi_e(m)$, $\theta_e(m)$ and $\varphi_e(m)$ to obtain the corrected coordinates $\psi_c(m)$, $\theta_c(m)$ and $\varphi_c(m)$ of the orientation $O_c(m)$, respectively.

Similarly, the state vector $X_{m|m}$ also contains three correction coefficients $\delta v_x(m)$, $\delta v_y(m)$ and $\delta v_z(m)$ used to correct the coordinates $Vx_e(m)$, $Vy_e(m)$ and $Vz_e(m)$ of the speed $V_e(m)$, respectively.

Conventionally, the state vector $X_{m|m}$ also contains correction coefficients for correcting other parameters, such as measurement biases of the accelerometer 44 and of the gyrometer 46, inter alia. In this embodiment, the state vector $X_{m|m}$ in addition contains:

three correction coefficients $\delta ba_x(m)$, $\delta ba_y(m)$ and $\delta ba_z(m)$ for correcting the measurement biases of the accelerometer 44 in the directions $x_b$, $y_b$ and $z_b$, respectively, three correction coefficients $\delta bg_x(m)$, $\delta bg_y(m)$ and $\delta bg_z(m)$ for correcting the measurement biases of the gyrometer 46 around axes parallel to the directions $x_b$, $y_b$ and $z_b$, respectively.

In this embodiment, the state vector $X_{m|m}$ is therefore the following vector of fifteen coordinates: $[\delta_\psi(m), \delta_\theta(m), \delta_\varphi(m), \delta v_x(m), \delta v_y(m), \delta v_z(m), \delta_x(m), \delta_y(m), \delta_z(m), \delta ba_x(m), \delta ba_y(m), \delta ba_z(m), \delta bg_x(m), \delta bg_y(m), \delta bg_z(m)]^T$, where the symbol "T" symbolizes the transpose operation.

The filter 64 is a recursive algorithm that, for each time $t_m$, delivers to the adder 66 a new state vector $X_{m|m}$ computed from:

the preceding state vector $X_{m-1|m-1}$, the measurement of the unit 40 or the new corrected distance acquired at the time $t_m$, and the position $P_e(m)$, orientation $O_e(m)$ and speed $V_e(m)$ constructed by the sub-module 60 for the time $t_m$.

Conventionally, the filter 64 comprises a predicting block 68 for computing a first state vector $X_{m|m-1}$ from the vector $X_{m|m-1}$, followed by an updating block 70 that computes the vector $X_{m|m}$ from the predicted vector $X_{m|m-1}$. These blocks are executed one after the other for each vector $X_{m|m-1}$.

More precisely, the block 68 constructs a prediction $X_{m|m-1}$ of the state vector from the preceding state vector $X_{m|m-1}$.

Here, an example of embodiment of the blocks 68 and 70 is described in the particular case where the filter 64 is an extended Kalman filter (EKF).

The equation used by the block 68 to propagate or predict the state of the filter 64 is defined by the following relationship, relationship (1):

$$X_{m|m-1} = A_{m-1}X_{m-1|m-1}$$

where:

$X_{m|m-1}$ is the estimation of the state vector at the time $t_{m-1}$, said estimation being obtained taking into account all the measurements up to the time $t_{m-1}$, $X_{m|m-1}$ is the prediction of the state vector at the time $t_m$, said prediction being obtained taking into account all the measurements up to the time $t_{m-1}$ but not taking into account the measurements acquired at the time $t_m$, $A_{m-1}$ is the state transition matrix at the time $t_{m-1}$.

In the particular case described here where the filter 64 is an error-state Kalman filter, the vector $X_{m-1|m-1}$ is always zero because it is assumed that the error was corrected previously. In other words, relationship (1) simplifies to the following relationship: $X_{m|m-1}=0$.

The equation used by the block 68 to propagate or predict the error covariance matrix is defined by the following relationship, relationship (2):

$$P_{m|m-1} = A_{m-1}P_{m-1|m-1}A_{m-1}^T + Q_{m-1}$$

where:

$P_{m-1|m-1}$ is the estimation of the error covariance matrix at the time $t_{m-1}$, said estimation being obtained taking into account all the measurements acquired up to the time $t_{m-1}$, $P_{m|m-1}$ is the prediction of the covariance matrix $P_m$ at the time $t_m$, said prediction being obtained solely taking into account the measurements acquired up to the time $t_{m-1}$, $Q_{m-1}$ is the covariance matrix of the process noise v.

The block 70 corrects the prediction $X_{m|m-1}$ of the state vector so as to obtain the state vector $X_{m|m}$. The corrected vector $X_{m|m}$ is constructed depending on a difference $Y_m$ between:

an estimation $\hat{z}_m$ of a physical quantity at the time $t_m$, and the measurement $z_m$ of the same physical quantity at the time $t_m$.

The difference $Y_m$ is known as "innovation". Here, the measured physical quantities are the position and speed measured by the unit 40 and, alternately, the corrected distance delivered by the sub-module 61. Thus, for each time $tg_i$, the block 70 corrects the prediction $X_{m|m-1}$ solely on the basis of the measurement of the unit 40 acquired at this time $tg_i$. Reciprocally, for each time $to_j$, the block 70 corrects the prediction $X_{m|m-1}$ solely on the basis of the corrected distance acquired at this time $to_j$. At the times $tg_i$, the prediction $X_{m|m-1}$ is corrected depending on differences in position and speed, for example as described in Godha2006. Thus, this functionality of the block 70 is not described in more detail. Only correction of the prediction $X_{m|m-1}$, at the times $to_j$ depending on the corrected distance, is described below.

In this example of embodiment, the physical quantity is the corrected distance $dc_m$. The estimation $\hat{z}_m$ of the corrected distance $dc_m$ is constructed using the following relationship, relationship (3):

where:

$$\hat{z} = \sqrt{(x_e(m)-B_x)^2+(y_e(m)-B_y)^2+(z_e(m)-B_z)^2}$$

m is the order number of a time $t_m$ of the sequence $\{0, t_1, t_2, \ldots, t_{m-1}, t_m, \ldots\}$ when a new corrected distance is acquired, $x_e(m)$, $y_e(m)$ and $z_e(m)$ are the coordinates of the position $P_e(m)$ estimated by the sub-module 60, said coordinates being expressed in the frame of reference $R_T$, $B_x$, $B_y$, $B_z$ are the coordinates of the position of the transceiver 22 in the frame of reference $R_T$.

The coordinates $B_x$, $B_y$, $B_z$ are constants and stored beforehand in the memory 54.

The innovation $Y_m$ is obtained using the following relationship, relationship (4): $Y_m = dc_m - \hat{z}_m$.

Typically, the block 70 corrects the prediction $X_{m|m-1}$ by adding thereto the innovation $Y_m$ multiplied by the Kalman gain Km. The gain $K_m$ is computed using the following relationship, relationship (5): $K_m = P_{m|m-1} H_m^T (H_m P_{m|m-1} H_m^T + R_m)^{-1}$, where:

the matrix $R_m$ is the covariance matrix of the noise in the corrected distance, and $H_m$ is an observation matrix.

The observation matrix $H_m$ is dependent on the partial derivative of relationship (3) with respect to the various parameters of the state vector $X_{m|m}$. The matrix $R_m$ is for example constant and initialized using data on the covariance of the noise in the measurements of the transmission and reception times obtained by the transceiver 20.

Next, the state vector $X_{m|m}$ is obtained using the following relationship, relationship (6): $X_{m|m} = X_{m|m-1} + K_m Y_m$.

The updated error covariance matrix at the time $t_m$ is computed using the following relationship, relationship (7): $P_{m|m} = (I - K_m H_m) P_{m|m-1}$, where I is the identity matrix.

The matrix $P_{m|m}$ contains the margins of error in the estimations of the correction coefficients.

In this particular embodiment, the adder 66 is a simple adder that adds, to the position $P_e(k)$, orientation $O_e(k)$ and speed $V_e(k)$, the corresponding correction coefficients contained in the state vector $X_{m|m}$. Next, the adder 66 delivers, to the output 37, the corrected position $P_c(k)$, orientation $O_c(k)$ and speed $V_c(k)$ thus obtained.

Figure 4:
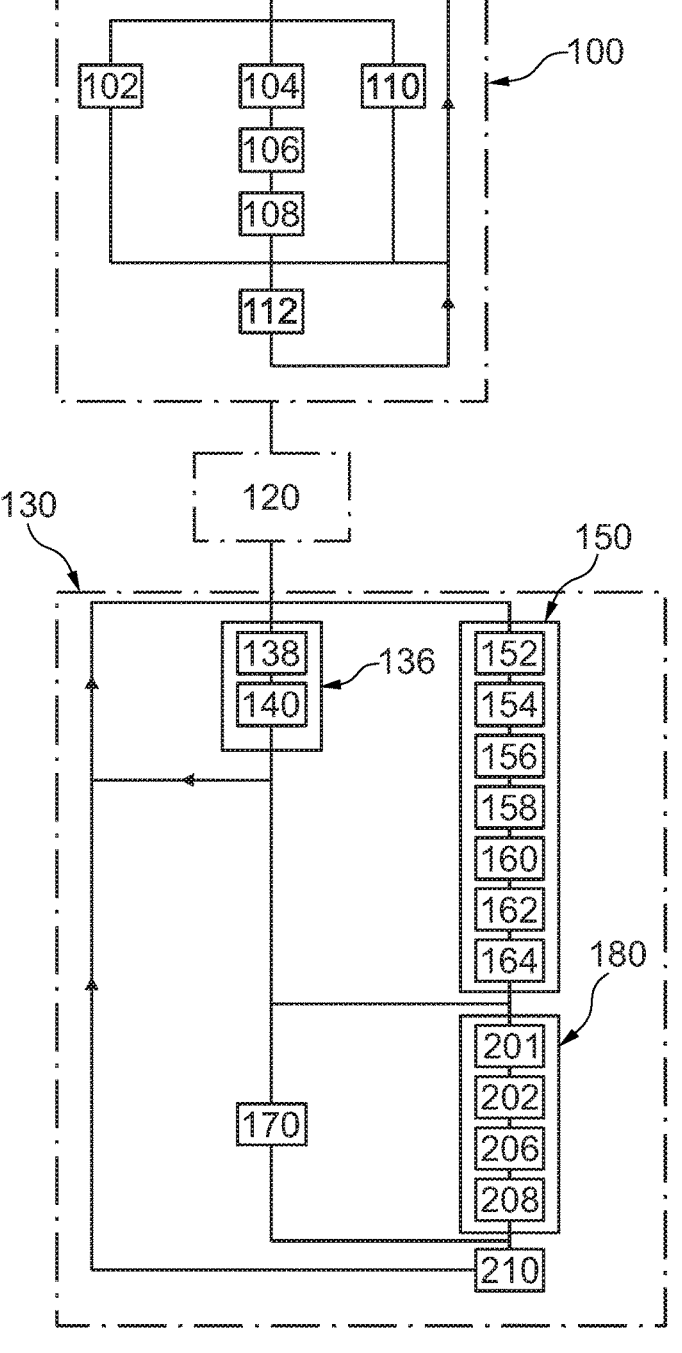
FIG. 4 is a flowchart of a method for locating the vehicle of FIG. 1 using the system of FIG. 2.

The operation of the system 30 will now be described with reference to the method of FIG. 4.

The method starts with a calibrating phase 100. In this phase 100 the correction functions $f_{S_n}$ associated with each of the segments S1 to S4 are determined.

To do this, in a step 102, the vehicle 2 is made to travel the entirety of the segment S1, starting from point A and ending at point B.

In parallel to step 102, in a step 104, the transceivers 20 and 22 exchange data frames in order to allow a raw distance between these transceivers 20, 22 to be measured from the transmission and reception times of these data frames. Each exchange of data frames allows a sufficient number of transmission and reception times to be acquired to compute a raw distance between these transceivers 20 and 22. For example, here, these exchanges are triggered periodically at the frequency $F_{20}$. Each exchange therefore occurs over the course of one respective period $T_{20,j}$.

In this example of embodiment, the two-way ranging method is employed. In this method, each exchange comprises:

transmission by the transceiver 20 of a first data frame, then in response to reception of this first data frame by the transceiver 22, transmission by the transceiver 22 of a second data frame.

The first data frame is transmitted at a time $M_{1,j}$ and received by the transceiver 22 at a time $M_{2,j}$. The second data frame is transmitted at a time $M_{3,j}$ and received by the transceiver 20 at a time $M_{4,j}$.

The times $M_{1,j}$ and $M_{4,j}$ are measured by the transceiver 20. The times $M_{2,j}$ and $M_{3,j}$ are measured by the transceiver 22. Since the time $M_{3,j}$ is measured by the transceiver 22, it cannot be transmitted to the transceiver 20 in the second data frame transmitted at this time. Here, the times $M_{2,j}$ and $M_{3,j}$ measured by the transceiver 22 are transmitted to the transceiver 20 in the second data frame sent in the course of the following period $T_{20,j+1}$. Because of this delay, the time $to_j$ at which the sub-module 62 acquires the distance $dc_j$ is well after the end of the period $T_{20,j}$.

When the transceiver 20 has measured the times $M_{1,j}$ and $M_{4,j}$ and received the measurements $M_{2,j}$ and $M_{3,j}$, in a step 106, the transceiver 20 transmits these measurements to the sub-module 61.

In response, in a step 108, the sub-module 61 computes a raw distance $db_j$ only from the transmission and reception times measured during the period $T_{20,j}$. Here, the distance $db_j$ is computed using the following relationship, relationship (8):

$$db_j = c \cdot \frac{(M_{4,j} - M_{3,j}) + (M_{2,j} - M_{1,j})}{2}$$

where the symbol "c" designates the speed of light. Below, unless otherwise indicated, the symbol "·" in a mathematical relationship designates the arithmetical operation of multiplication.

In parallel to steps 104 to 108, in a step 110, and in each period $T_{20,j}$, a precise distance $dp_j$ is measured without using the transmission and reception times of the data frames. To do this, measurements are taken by another sensor independent of the transceivers 20 and 22. Typically, this other sensor is used only during the calibrating phase 100. This sensor must have a better accuracy, and typically an accuracy two or ten times better, than the accuracy of the measurement of the raw distance $db_j$. For example, this other sensor is an optical range-finder temporarily installed along the segments S1 to S4.

In a step 112, once the distances $db_j$ and $dp_j$ have been obtained for a multitude of different positions of the vehicle 2 along the segment S1, a correction function $f_{s1}$ that returns the correction coefficient allowing the distance $db_j$ to be corrected is determined. To do this, for each pair of distances $db_j$ and $dp_j$, an error $ed_j$ between these distances $db_j$ and $dp_j$ is computed. The function $f_{s1}$ is parametrized by the value of a physical quantity chosen from the group consisting:

of the distance d between the transceivers 20 and 22, and of a physical quantity representative of the power of the received radio signals.

In this example of embodiment, the function $f_{s1}$ is parametrized by the distance d and therefore denoted $f_{s1}$ (d).

Here, the function $f_{s1}$ (d) is defined by the following relationship, relationship (9):

$$f_{s1}(d) = a_{s1} \cdot \frac{d}{\sqrt{d_{0,s1}^2 + d^2}} + b_{s1}$$

where $a_{s1}$, $b_{s1}$ and $d_{0,s1}$ are constants. This function $f_{s1}$ (d) is entirely defined once the values of the constants $a_{s1}$, $b_{s1}$ and $d_{0,s1}$ are known. Here, to determine the function $f_{s1}$ (d), the values of the constants $a_{s1}$, $b_{s1}$ and $d_{0,s1}$ that minimize the following difference for all the measured distances $dp_j$ are computed: $|f_{s1}(dp_j) - ed_j|$. For example, to do this, a numerical solver is used.

Once the function $f_{s1}$ (d) has been determined, it is associated with the segment S1 in the table 58. For example, to do this, the values of the constants $a_{s1}$, $b_{s1}$ and $d_{0,s1}$ are associated with the segment S1 by the table 58.

The preceding steps, which have been described in the particular case of the segment S1, are reiterated for each of the segments and hence, at the end of the phase 100, the table 58 contains one correction function associated with each of the segments S1 to S4. Most often, the correction functions thus determined are all different from one another.

After the calibrating phase 100, the system 30 is used to determine a corrected distance $dc_j$ between the transceivers 20 and 22 and to locate the vehicle 2.

Use of the system 30 to locate the vehicle 2 starts with a phase 120 of initializing the system 30. This phase 120 starts immediately after activation of the system 30, i.e. typically just after it has been turned on. In this phase 120, the various variables and parameters required by the execution of the module 56 are initialized. For example, the values of the position, speed and orientation of the vehicle 2 and of the correction coefficients are initialized to initial values. There are many algorithms that allow these initial values to be rapidly obtained.

Once the initializing phase 120 has ended, a phase 130 of executing the module 56 begins.

In a step 136, each time new measurements of the unit 42 are acquired by the computer 50, the module 56 determines and updates the position, orientation and speed of the vehicle 2. Thus, for each time $t_k$, the position, orientation and speed of the vehicle 2 are updated.

More precisely, step 136 comprises an operation 138 in which the accelerometer 44 and gyrometer 46 measure the acceleration and angular velocity of the vehicle 2, respectively, and these new measurements are acquired by the computer 50 at the time $t_k$.

Next, in an operation 140, the sub-module 60 constructs the raw estimations $P_e(k)$, $O_e(k)$ and $V_e(k)$ from:

the preceding position $P(k-1)$, the preceding orientation $O(k-1)$ and the preceding speed $V(k-1)$, and the measurements of the accelerometer 44 and of the gyrometer 46 acquired at the time $t_k$.

In parallel to step 136, a step 150 of determining the distance between the transceivers 20, 22 is executed. This step 150 is reiterated at the frequency $F_{20}$ in order to provide, to the sub-module 62, a new corrected distance $dc_j$ at each time $to_j$.

Step 150 comprises the following operations in succession:

an operation 152 of exchanging data frames between the transceivers 20, 22, an operation 154 of transmission of the times $M_{1,j}$, $M_{2,j}$, $M_{3,j}$ and $M_{4,j}$ to the computer 50 and of acquisition of these times by the sub-module 61, an operation 156 of computation of the raw distance $db_j$, an operation 158 of identification among the segments S1 to S4 of the segment on which the vehicle 2 is found, an operation 160 of selection of the correction function associated with the identified segment, an operation 162 of execution of the selected correction function, then an operation 164 of correction of the raw distance $db_j$ to obtain the corrected distance $dc_j$.

Operations 152, 154 and 156 are identical to steps 104, 106 and 108, respectively.

In the operation 158, to identify the segment on which the vehicle 2 is currently found, the sub-module 61 uses the last position of the vehicle 2 estimated by the sub-module 60. In contrast, in this example of embodiment, the coordinates of the segments S1 to S4 are not used. To perform said identification, direction vectors $u_v$ and $u_b$ are associated with the transceivers 20 and 22, respectively. The vector $u_v$ is fixed with respect to the body of the vehicle 2. Thus, this vector $u_v$ changes only if the orientation of the vehicle changes. The vector $u_b$ is fixed with respect to the transceiver 22. Since the transceiver 22 is immobile, the vector $u_b$ does not change. The directions in which the vectors $u_v$ and $u_b$ point may be chosen arbitrarily. Specifically, these vectors $u_v$ and $u_b$ are simply used to express the relative orientation of the transceivers 20, 22.

In this example of embodiment, to simplify the computations, the vectors $u_v$ and $u_b$ are horizontal. Again to simplify the computations, the vector $u_v$ is chosen to lie parallel to the direction $x_b$ of the frame of reference $R_b$ and to be of opposite sign to the direction $x_b$. Here, the vector $u_b$ is chosen to lie parallel to and to be of same sign as the vector $u_v$, when the vehicle is on the segment S1.

Under these conditions, the coordinates of the vector $u_v$ are given by the following relationship:

$$u_v = [\cos(\psi_v)\sin(\psi_v)0]^T$$

where the angle $\psi_v$ is the yaw angle of the vehicle 2, which is obtained from the last orientation $O_e(k)$ estimated by the sub-module 60.

For its part, the vector $u_b$ is defined by the following relationship:

$$u_b = [\cos(\psi_b)\sin(\psi_b)0]^T$$

where the angle $\psi_b$ is the yaw angle of the transceiver 22. The angle $\psi_b$ is a constant because the transceiver 22 is fixed.

In the operation 158, the sub-module 61 computes the coordinates of a direction vector $u_{bv}$ that points from the geometric centre of the antenna of the transceiver 22 to the geometric centre of the antenna of the transceiver 20. The coordinates of this vector $u_{bv}$ are given by the following relationship:

$$u_{bv} = \frac{[x_e(k) - B_x \; y_e(k) - B_y \; z_e(k) - B_z]^T}{\|[x_e(k) - B_x \; y_e(k) - B_y \; z_e(k) - B_z]\|}$$

where:

$x_e(k)$, $y_e(k)$ and $z_e(k)$ are the coordinates of the current position $P_e(k)$ of the vehicle 2, and $B_x$, $B_y$, $B_z$ are the coordinates of the position of the transceiver 22.

Next, the sub-module 61 computes the cosine of an end angle $\alpha_v$ and of a start angle $\alpha_b$ using the following relationships:
and $$\cos(\alpha_v) = -u_{bv}^T \cdot u_v$$

$$\cos(\alpha_b) = -u_{bv}^T \cdot u_b$$

Finally, the sub-module 61 identifies the segment on which the vehicle 2 is found from the signs of the cosines of the angles $\alpha_v$ and $\alpha_b$ using a pre-stored table such as the following table:

| Sign of cos $(\alpha_v)$ | Sign of cos $(\alpha_b)$ | Corresponding segment |
|---|---|---|
| − | + | S1 |
| + | − | S2 |
| − | − | S3 |
| + | + | S4 |

This table allows the identified segment to be obtained from the signs of the computed $\cos(\alpha_v)$ and $\cos(\alpha_b)$. The signs in the columns of this table result from arbitrary choices made when defining the direction vectors $u_v$ and $u_b$. This table must therefore be modified depending on these choices. The only really important thing is to keep the same conventions between the time when this table is constructed and the times when this table is used.

In the operation 160, the sub-module 61 selects the correction function associated by the table 58 with the segment identified in the operation 158.

In the operation 162, the sub-module 61 executes the selected correction function. To do this, for example, it computes a distance d between the transceivers 20, 22 on the basis of the last position $P_e(k)$ estimated for the vehicle 2 and of the coordinates of the transceiver 22. Next, it executes the selected correction function parametrized by the value of this distance d. The sub-module 61 thus obtains a correction coefficient Cd.

Lastly, in the operation 164, the sub-module 61 computes the corrected distance $dc_j$ using the following relationship: $dc_j = db_j - Cd$. It is this distance $dc_j$ that is acquired by the sub-module 62 at the time $to_j$.

Next, only if the time $t_k$ is in addition a time $tg_i$ when a measurement of the unit 40 is acquired, after step 136, the computer 50 executes a step 170 of updating the correction coefficients depending on the new measurement of the unit

40. In this step 170 the correction coefficients are updated without using the transmission and reception times obtained by the transceiver 20.

Only if the time $t_k$ is a time $to_j$ when a corrected distance $dc_j$ is acquired, after step 136, the computer 50 executes a step 180 of updating the correction coefficients depending on the new corrected distance $dc_j$. In this step 180 the correction coefficients are updated without using the measurement of the unit 40.

If the time $t_k$ corresponds neither to a time $tg_i$ nor to a time $to_j$, then the position $P_e(k)$, orientation $O_e(k)$ and speed $V_e(k)$ as estimated by the sub-module 60 and not corrected by the sub-module 62 are delivered to the output 37. Thus at times $t_k$ located between the times $t_m$, it is the position $P_e(k)$, orientation $O_e(k)$ and speed $V_e(k)$ that are delivered to the output 37. In addition, the method returns to step 136 without executing either step 170 or step 180. In this case, the preceding position, the preceding orientation and the preceding speed used in the next iteration of step 136 are also the position $P_e(k)$, orientation $O_e(k)$ and speed $V_e(k)$, respectively.

In step 180, the sub-module 62 begins by acquiring, in an operation 201, the new corrected distance $dc_j$.

Next, in an operation 202, the block 68 is executed by the computer 50 to obtain the predicted state vector $X_{m|m}$ from the preceding estimation $X_{m-1|m-1}$ of this state vector. The preceding estimation is the estimation obtained at the preceding time $t_{m-1}$. The preceding time $t_{m-1}$ corresponds either to a time $tg_i$ or to the time $to_{j-1}$. Thus, the preceding estimation is the estimation that was constructed either in the preceding execution of step 170 or in the preceding execution of step 180. The prediction $X_{m|m-1}$ of the state vector is constructed by implementing relationship (1). In this particular case where the filter 64 is an error-state Kalman filter, the prediction $X_{m|m-1}$ is systematically zero.

In the operation 202, the block 68 also constructs the prediction $P_{m|m-1}$ of the covariance matrix $P_m$ at the time $t_m$ by implementing relationship (2).

In an operation 206, the block 70 constructs the estimation $\hat{z}_m$ of the distance between the transceivers 20, 22 by implementing relationship (3). In this embodiment, in the operation 206, the block 70 also computes the observation matrix $H_m$. The matrix $H_m$ is, for example, computed by taking the derivative of relationship (3) with respect to each of the various parameters of the state vector $X_{m|m}$.

In the following operation, operation 208, the block 70 updates the correction coefficients. To do this, it corrects the prediction $X_{m|m-1}$ depending on the innovation $Y_m$ between the corrected distance $dc_j$ and its estimation $\hat{z}_m$. To this end, the block 70 computes the innovation $Y_m$ using relationship (4). Next, the gain $K_m$ is computed using relationship (5). The corrected state vector $X_{m|m}$ is then obtained by implementing relationship (6).

In the operation 208, the block 70 also obtains the covariance matrix $P_{m|m}$ updated using relationship (7).

At the end of steps 170 and 180, in a step 210, the sub-module 62 corrects the position $P_e(m)$, orientation $O_e(m)$ and speed $V_e(m)$ to obtain the corrected position $P_c(m)$, the corrected orientation $O_c(m)$ and the corrected speed $V_c(m)$.

To do this, the adder 66 adds the correction coefficients contained in the vector $X_{m|m}$ to the corresponding coordinates of the position $P_e(m)$, orientation $O_e(m)$ and speed $V_e(m)$ constructed in the last execution of the operation 136, to obtain the position $P_c(m)$, orientation $O_c(m)$ and speed $V_c(m)$. Thus, only at the times $t_m$, it is the position $P_c(m)$, orientation $O_c(m)$ and speed $V_c(m)$ that are delivered to the output 37, and not the position $P_e(m)$, orientation $O_e(m)$ and speed $V_e(m)$. In addition, in step 210, the position $P(k)$, orientation $O(k)$ and speed $V(k)$ are transmitted to the sub-module 60 and used by the sub-module 60 as preceding position, preceding orientation and preceding speed of the vehicle 2 in the next iteration of step 136.

After step 210, the method returns to step 136.

Section II: Variants

Variants of the Determination of Distance:

Other methods for measuring the raw distance $db_j$ from the times of transmission and reception of data frames between the transceivers 20 and 22 may be implemented. For example, as a variant, the two-way ranging method is replaced by a three-way ranging method. In this three-way ranging method, each exchange of data frames between the transceivers 20 and 22 comprises, in addition to the transmission of first and second data frames, the transmission by the transceiver 20, in response to reception of the second data frame, of a third data frame at a time $M_{5,j}$ and reception of this third data frame by the transceiver 22 at a time $M_{6,j}$. In this case, the raw distance $db_j$ is computed using the following relationship:

$$db_j = c \cdot \frac{1}{2 + \varepsilon^{AB}}\left((M_{3,j} - M_{2,j}) + \left(1 + \varepsilon^{AB}\right)(M_{4,j} - M_{1,j})\right)$$

where $\varepsilon^{AB}$ is defined by the following relationship:
where $\Delta T$ is equal to $M_{5,j} - M_{1,j}$.

$$\varepsilon^{AB} = \frac{(M_{6,j} - M_{2,j})}{\Delta T} - 1$$

The measurements of the times $M_{2,j}$ and $M_{3,j}$ may be transmitted to the transceiver 20 by other means than the second data frame emitted in the course of the period $T_{20,j+1}$. For example, these times $M_{2,j}$ and $M_{3,j}$ are transmitted to the transceiver 20 via an additional data frame the transmission and reception times of which are not used to compute the distance $db_j$. In another embodiment, this additional frame is transmitted via a data-transmission link set up using transceivers independent of the transceivers 20 and 22.

As a variant, the transceivers 20 and 22 are capable of taking an approximate measurement and a precise measurement of the reception times. In this case, advantage may be taken of this capability, for example in the following way. UWB technology uses an indicator known by the acronym FPI (standing for First Path Index). This indicator is constructed by the transceivers 20, 22. This indicator must normally be comprised between an upper limit $L_H$ and a lower limit $L_B$. When this indicator is between the limits $L_H$ and $L_B$, it is precise measurement that is used. In contrast, if this indicator is not comprised between these limits $L_H$ and $L_B$, it is the approximate measurement that is used.

As a variant, the computation of the raw distance $db_j$ allows for drift in the clock located in the transceiver 20 with respect to the clock located in the transceiver 22.

These clocks are used to measure the transmission and reception times of the data frames. To do this, for example, the raw distance $db_j$ is computed using the following relationship:

$$db_j = c \cdot \frac{(M_{4,j} - M_{1,j}) - (M_{3,j} - M_{2,j})(1 + \varepsilon_{drift,j})}{2}$$

where $\varepsilon_{drift,j}$ is defined by the following relationship:

$$\varepsilon_{drift,j} = \frac{\Delta T_{remote,j} - \Delta T_{local,j}}{\Delta T_{remote,j}}$$

where $\Delta T_{remote,j} = M_{2,j} - M_{2,j-1}$ and $\Delta T_{local,j} = M_{1,j} - M_{1,j-1}$.

The roles of the transceivers 20 and 22 may be reversed. In this case, it is the transceiver 22 that transmits the first data frame at the time $M_{1,j}$ and, in response to reception of this first data frame, the transceiver 20 transmits the second data frame at the time $M_{3,j}$. In this embodiment, the times $M_{2,j}$ and $M_{3,j}$ are measured by the transceiver 20 and the times $M_{1,j}$ and $M_{4,j}$ are measured by the transceiver 22. The transceiver 22 transmits the measured times $M_{1,j}$ and $M_{4,j}$ to the transceiver 20, for example in the first data frame transmitted at the time $M_{1,j+1}$.

As a variant, the coordinates $B_x$, $B_y$ and $B_z$ of the position of the fixed transceiver 22 are contained in a data frame, for example the second data frame transmitted from the transceiver 22 to the transceiver 20. In this case, these coordinates do not need to be stored in the memory 54 beforehand.

Other embodiments of the correction functions are possible. In particular, forms other than the one given in relationship (9) are possible for each correction function. For example, the correction function may be entirely defined by the values of four constants instead of three. For example, the correction function may be a polynomial of third or second degree, or a quotient of two polynomials of first degree. In particular, it is possible to use correction functions that are entirely defined by less than three constants. For example, in this case, the correction function is a polynomial of first degree or a constant. In the latter case, the correction coefficient is constant and independent of the distance d.

In the operation 162, the value of the distance d used to execute the selected correction function may be obtained differently. For example, the distance d is set equal to the distance $db_j$ computed in operation 156.

As a variant, the correction function is parametrized by the value of a physical quantity representative of the power of the radio signal received by the transceivers 20, 22. This physical quantity may be directly the power of the received radio signal or another physical quantity that represents this power. For example, by way of illustration, this physical quantity may also be the signal-to-noise ratio, a gain, a number of pilot symbols used, inter alia. In the case where the correction function is parametrized by a physical quantity representative of the power of the received radio signal, in the calibrating phase 100 this physical quantity is measured for each position where the distance $dp_j$ is measured. Next, these measurements of this physical quantity are used to determine the various constants that define the correction function.

In another variant, the correction function is parametrized both by the distance d and by the physical quantity representative of the power of the received radio signals.

Although the commonest case is for all the determined correction functions to be different from one another, the correction functions associated with two or more segments may potentially be identical.

Other methods for identifying the segment on which the vehicle 2 is found are possible. For example, as a variant, the segment on which the vehicle 2 is found is identified by comparing the current position $P_e(k)$ of the vehicle 2 with the coordinates of the various segments S1 to S4. For example, in the case where the segments S1 to S4 are straight line segments, the sub-module 61 verifies that the position $P_e(k)$ belongs to one of these straight line segments. To do this, for example, the equations defining each of these straight line segments are used. In the latter case, the orientation $O_e(k)$ of the vehicle 2 is not required to identify the segment on which the vehicle 2 is current found. In another variant, the current position $P_e(k)$ allows the curvilinear abscissa of the vehicle 2 with respect to a reference point to be determined. This curvilinear abscissa then allows the segment on which the vehicle 2 is found to be identified by comparing it to the curvilinear abscissae of the start and end points of each segment.

The number of predetermined segments may be different from four. For example, in one simplified embodiment, it is equal to two. Such a case is obtained if the segments S1 and S2 are replaced by a single segment that extends from point A to point C and if the segments S3 and S4 are replaced by a single segment that extends from point D to point F. In another variant, the number of predetermined segments associated with the transceiver 22 is higher than four.

Variants of the Kalman Filter:

Many other embodiments of the filter 64 are possible. For example, the filter 64 may be a linear Kalman filter, an extended Kalman filter (EKF), an unscented Kalman filter (UKF) or even an adaptive Kalman filter.

There are many variants of the relationships implemented in the Kalman filter. Specifically, these relationships depend on the frame of reference in which the position, orientation and speed of the vehicle are expressed. However, other frames of reference are usable instead of the frame of reference $R_T$. For example, mention may be made of the ECI frame (ECI standing for Earth Centred Inertial). The ECI frame is not stationary with respect to the Earth's surface since the Earth rotates in this frame of reference. The frame of reference $R_T$ may also be a frame of reference that is fixed with respect to the stars. When another frame of reference is used, it is possible, via a simple change of coordinate system, to return to the situation described here.

The relationships of the Kalman filter may also contain an additional rotation matrix in order to take into account the fact that the measurement axes of the unit 42 are not aligned with the axes of the frame of reference $R_b$.

Likewise, many variants of the state vector $X_{m|m}$ are possible. For example, the state vector $X_{m|m}$ may also not contain a correction coefficient for the biases of the accelerometer 44 and of the gyrometer 46. The state vector $X_{m|m}$ may also contain additional state variables.

What was taught above in the particular case where the correcting sub-module 62 uses one or more Kalman filters also applies to correcting sub-modules that construct the correction coefficients using estimators other than Kalman filters. Generally, what has been taught here applies to any correcting sub-module configured to update the correction coefficients using an innovation between:

a measurement of a physical quantity constructed using the corrected distance $dc_j$, and an estimation of this physical quantity constructed using measurements of the unit 42.

Other embodiments of the sub-module 62 are possible. For example, as a variant, the sub-module 62 has a tight-coupling architecture. This architecture is described in more detail in chapter 4.1.2 of the thesis Godha2006.

Variants of the Locating System:

As a variant, the transceivers 20, 22 are not UWB transceivers. For example, the transceivers 20, 22 are replaced by radio transceivers that use a much narrower frequency spectrum to exchange the data frames.

As a variant, the system 30 is equipped with additional sensors, such as for example a magnetometer, a barometer or an odometer. In this case, the correcting sub-module 62 is modified to take into account the measurements of these additional sensors to correct the raw estimations delivered by the integrating sub-module 60.

In another embodiment, the satellite geolocation unit 40 is omitted. In this case, for example, the correction coefficients are updated solely using the corrected distances $dc_j$.

As a variant, the system for locating the vehicle 2 comprises a single fixed transceiver or, in contrast, a plurality of fixed transceivers. In the case where the system comprises a plurality of fixed transceivers, the latter are preferably distributed at regular intervals along the path or along one length of this path. In the latter case, if the mobile transceiver 20 is able to simultaneously communicate with a plurality of fixed transceivers, then, instead of delivering at a time $to_j$ a single corrected distance, the sub-module 61 simultaneously delivers a plurality of corrected distances, each of these distances corresponding to a distance between the transceiver 20 and one respective fixed transceiver. Next, the sub-module 62 corrects the estimation of the position by taking into account these various distances and the known positions of the various fixed transceivers.

As a variant, the electronic computer 50 is not housed inside the vehicle 2 but elsewhere. For example, the electronic computer 50 is housed inside a fixed anchor that already contains the transceiver 22.

Variants of the Method:

The method described here for determining the corrected distance $dc_j$ may be used in methods other than methods for locating a vehicle. In particular, the corrected distance $dc_j$ may be used for purposes other than the purpose consisting in correcting an estimation of the position of the vehicle. For example, the method for determining the corrected distance $dc_j$ is implemented only in the case where only the distance between the transceivers 20, 22 must be determined. In such a case, the position of the vehicle is determined by any means such as, for example, solely using the satellite geolocation unit 40 or any other sensor capable of determining the position of the vehicle 2 independently of the measurements of the times of transmission and reception of data frames exchanged between the transceivers 20, 22.

The position, orientation and speed of the vehicle 2 may be determined by methods other than those implementing a fusing algorithm such as described above. In this case, the fusing algorithm is replaced by another algorithm that performs the same function and that allows the position of the vehicle 2 to be determined. Thus, in simplified variants, only the position of the vehicle 2 is estimated.

The position of the vehicle 2 may be determined from measurements of one or more other measurement units. For example, these measurement units are chosen from the group consisting of:

the satellite geolocation unit 40;

the inertial measurement unit 42, an odometer, a magnetometer associated with a map of terrestrial magnetic fields.

Thus, what has been described may also be implemented in a locating system in which the units 40 and 42 are replaced by one or more other sensors whereby the position of the vehicle 2 may be determined.

As a variant, it is possible for, at a given time $t_m$, a new measurement of the unit 40 and a new corrected distance to be acquired. In other words, as a variant, the times $tg_i$ and $to_j$ may be concomitant. In this case, the computer 50 updates the correction coefficients depending both on the new measurements of the unit 40 and on the new corrected distance. For example, to do this, the computer 50 computes a new gain $K_m$ depending on an observation matrix formed by concatenation of the matrix $H_m$ and of the observation matrix used to update the correction coefficients depending on the measurement of the unit 40.

In another embodiment the corrected distance is added to the state vector of the Kalman filter and the state and observation matrices are modified accordingly. However, such an embodiment then requires the Kalman filter to be executed at each time $t_k$, this not always being desirable.

Other Variants:

The vehicle 2 is not necessarily a gondola lift. What has been described applies to any vehicle constrained to move over a countable number of predetermined segments. For example, the system 30 may be applied to the case where the vehicle is a motor vehicle. In this case, each segment corresponds to one traffic lane. If the road comprises more than two traffic lanes then, preferably, more than two predetermined segments are used in order for each segment to correspond to one respective lane. The system 30 may also be applied to a rail vehicle. In the latter case, the lanes are tracks of a railway.

As a variant, the various predetermined segments associated with the same fixed transceiver are not parallel to one another. Such a situation may arise when the segments correspond to segments of railway tracks or of traffic lanes that cross in proximity to a given fixed transceiver.

As a variant, when the vehicle 2 is travelling a path segment, it may diverge slightly from the reference path travelled by this vehicle in the calibrating phase 100 without this decreasing the accuracy of the corrected distance $dc_j$. Here, a difference between the current path of the vehicle 2 and the reference path is considered to be slight if, at any point A of the current path, the difference $|\theta_v - \theta_{ref}|$ remains smaller than 10° or 5°, where:

$\theta_v$ is the angle between the direction vectors $u_v$ and $u_b$ that were defined above when the vehicle is located at point A of the current path, and $\theta_{ref}$ is the angle between the direction vectors $u_v$ and $u_b$ when the vehicle is located on the point of the reference path closest to the current point A.

As a variant, the control post 38 is located inside the vehicle 2. This is notably the case when the vehicle 2 is, for example, a motor vehicle or a rail vehicle.

In one simplified embodiment, the system 30 does not determine the speed of the vehicle 2. In this case, the module 56 may be simplified.

Section III: Advantages of the Described Embodiments

The fact of using a plurality of correction functions each associated with one respective segment of the path makes it possible to determine, on each of these segments, a correction function that is both simple and rapid to execute while remaining accurate. In addition, these correction functions are simpler to establish. Specifically, the number of values that each of these correction functions must approximate as accurately as possible is much lower than the total number of values to be approximated along the complete path of the vehicle 2. The fact that the number of values to be approximated is much lower makes it possible to use, at equal accuracy, a correction function that is simpler to implement and more rapid to execute. Thus, by associating with each of the segments one respective correction function, it is possible to simplify the implementation of the method without decreasing accuracy, or indeed even increasing it. In addition, the number of segments remains low since the vehicle is constrained to move along a limited number of segments.

In the context where the corrected distance $dc_j$ is used to locate a vehicle, simplifying the implementation of the determination of this corrected distance without decreasing the accuracy thereof also makes it possible not to decrease the accuracy of the position determined for the vehicle.

Parametrizing the correction function with the distance d between the transceivers 20 and 22 or depending on a physical quantity representative of the power of the received radio signals improves the accuracy of the corrected distance $dc_j$.

The fact that the correction function is parametrized by the distance d rather than a physical quantity representative of the power of the received radio signals also makes it possible to further increase the accuracy of the distance $dc_j$.

The fact that the correction function is entirely defined by at most three constants simplifies the determination of this correction function in the calibrating phase 100. In addition, such a calibration function is then simple to implement, without however decreasing the accuracy of the corrected distance $dc_j$.

The invention claimed is:

1. A method for determining a corrected distance between a mobile transceiver fastened to a vehicle and a fixed transceiver, said method comprising the following steps when the vehicle is moving along a path segment belonging to a countable set of a plurality of predetermined path segments:

exchanging, by the mobile transceiver, radio signals with a fixed transceiver, acquisition, by an electronic computer, of transmission and reception times of the radio signals exchanged between the fixed and mobile transceivers, computation, by the electronic computer, of a raw distance between the fixed and mobile transceivers solely from the acquired transmission and reception times of the exchanged radio signals, then determination, by the electronic computer, of a position of the vehicle, wherein the method comprises:

identification, among the set of predetermined path segments, of the predetermined segment on which the vehicle is currently found on the basis of the last position determined for said vehicle, then selection of a correction function specifically associated with the identified segment using a table that associates, with each path segment, a respective correction function, each of these correction functions being able, when it is executed, to deliver a correction coefficient for correcting the raw distance, then execution of the identified correction function to obtain a current correction coefficient, then correction of the last raw distance computed using the current correction coefficient to obtain the corrected distance, wherein the determination, by the electronic computer, of the position of the vehicle is based at least partially on the obtained corrected distance.

2. The method according to claim 1, wherein:

each correction function:

is parametrized by a first physical quantity so that the delivered correction coefficient varies as a function of a value of said first physical quantity even when the vehicle remains inside the same predetermined segment, said first physical quantity being chosen from a group made up:

of the distance between the fixed and mobile transceivers, and of a physical quantity representative of the power of the received radio signals, and is different from at least one of the other correction functions in that, for a given value of the first physical quantity, it delivers a different correction coefficient, the method comprises obtaining the current value of the first physical quantity, and the execution of the identified correction function comprises execution of the identified correction function parametrized with the obtained current value of the first physical quantity to obtain the current correction coefficient.

3. The method according to claim 2, wherein the first physical quantity is the distance between the fixed and mobile transceivers.

4. The method according to claim 2, wherein the method comprises a calibrating phase in which, for each predetermined path segment and for various positions of the vehicle on said predetermined path segment:

a raw distance between the fixed and mobile transceivers is computed solely from the acquired transmission and reception times of the exchanged radio signals, and for the same vehicle position, an accurate distance is measured using another sensor that allows a distance measurement that is more accurate than the raw distance to be obtained without using the acquired transmission and reception times of the exchanged radio signals, then determination of the correction function that approximates the variation in the error between the computed raw distance and the measured accurate distance depending on the value of the first physical quantity, and association of said correction function with said predetermined path segment.

5. The method according to claim 1, wherein each correction function is defined by the following relationship:

$$f_{sn}(d) = a_{sn} \cdot \frac{d}{\sqrt{d_{0,sn}^2 + d^2}} + b_{sn}$$

where $a_{sn}$, $b_{sn}$ and $d_{0,sn}$ are three constants that entirely define the correction function, values of the constants $a_{sn}$, $b_{sn}$ and $d_{0,sn}$ minimize a difference between a precise distance measured without using a sensor and an error between the precise distance and the raw distance.

6. The method according to claim 1, wherein the radio signals are ultra-wideband signals.

7. The method according to claim 1, further comprising:

acquisition, by the electronic computer, of a measurement of a second physical quantity that varies as a function of the position of the vehicle, said measurement being taken by a sensor independent of the fixed and mobile transceivers, then determination, by the electronic computer, of the position of the vehicle from the acquired measurement of the second physical quantity and from the determined corrected distance.

8. The method according to claim 7, wherein the acquisition of a measurement of the second physical quantity comprises acquisition of a measurement chosen from the group made up:

of a first measurement of an acceleration of the vehicle, taken by an inertial navigation system, and of a second measurement of the position or speed of the vehicle, taken by a satellite geolocation unit.

9. The method according to claim 8, wherein:

the acquisition of a measurement of the second physical quantity comprises:

acquisition of a third measurement of an angular velocity of the vehicle, taken by the inertial navigation system, and the method in addition comprises determination, by the electronic computer, of the orientation of the vehicle from the acquired measurements of the acceleration and angular velocity of the vehicle and of the determined corrected distance.

10. A system for determining a corrected distance between a mobile transceiver fastened to a vehicle and a fixed transceiver, said system comprising an electronic computer configured to execute the following steps when the vehicle is moving along a path segment belonging to a countable set of a plurality of predetermined path segments:

exchanging, by the mobile transceiver, radio signals with a fixed transceiver, acquisition, by the electronic computer, of transmission and reception times of the radio signals exchanged between the fixed and mobile transceivers, computation, by the electronic computer, of a raw distance between the fixed and mobile transceivers solely from the acquired transmission and reception times of the exchanged radio signals, then determination, by the electronic computer, of a position of the vehicle, wherein the electronic computer is also configured to execute the following operations:

identification, among the set of predetermined path segments, of the predetermined segment on which the vehicle is currently found from the last position determined for said vehicle, then selection of a correction function specifically associated with the identified segment using a table that associates, with each segment of the path, a respective correction function, each of these correction functions being able, when it is executed, to deliver a correction coefficient for correcting the raw distance, then execution of the identified correction function to obtain a current correction coefficient, then correction of the last raw distance computed using the current correction coefficient to obtain the corrected distance, wherein the determination, by the electronic computer, of the position of the vehicle is based at least partially on the obtained corrected distance.

* * * * *